(12) United States Patent
Tamagawa (10) Patent No.: US 7,372,596 B2
(45) Date of Patent: May 13, 2008

(54) COLOR CONVERSION DEFINITION CREATING METHOD, COLOR CONVERSION DEFINITION CREATING APPARATUS, AND COLOR CONVERSION DEFINITION CREATING PROGRAM STORAGE MEDIUM

(75) Inventor: Kiyomi Tamagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 995 days.

(21) Appl. No.: 10/359,652

(22) Filed: Feb. 7, 2003

(65) Prior Publication Data

US 2003/0164966 A1   Sep. 4, 2003

(30) Foreign Application Priority Data

Mar. 1, 2002  (JP)  ............................. 2002-055376

(51) Int. Cl.
  *H04N 1/60*  (2006.01)
  *G06K 9/00*  (2006.01)
(52) U.S. Cl. .................... 358/1.9; 358/1.9; 358/2.1; 358/1.16; 358/518; 358/520; 358/522; 358/523; 358/539; 382/162; 382/166; 382/167
(58) Field of Classification Search ................ 358/1.9, 358/1.15, 518, 529, 2.1, 1.16, 523, 522, 520, 358/539; 382/162, 166, 167; 347/15; 348/650; 430/43.1
See application file for complete search history.

(56) References Cited

U.S. PATENT DOCUMENTS 5,416,613 A * 5/1995 Rolleston et al. .......... 358/518
6,268,930 B1 * 7/2001 Ohta et al. .................. 358/1.9
6,341,175 B1   1/2002 Usami
6,466,332 B1 * 10/2002 Fukasawa .................. 358/1.9
6,781,716 B1 * 8/2004 Yoda .......................... 358/1.9
2001/0038468 A1  11/2001 Hiramatsu
2005/0174586 A1 * 8/2005 Yoshida et al. ............. 358/1.9

FOREIGN PATENT DOCUMENTS

JP    2001-103330      4/2001
WO    WO 99/01982 A1   1/1999
WO    WO 00/52925 A1   9/2000
WO    WO 00/74372 A1   12/2000
WO    WO 01/24511 A1   4/2001

* cited by examiner

*Primary Examiner*—King Y. Poon
*Assistant Examiner*—S. Kau
(74) *Attorney, Agent, or Firm*—Sughrue Mion, PLLC (57) ABSTRACT

A combined profile is created through a first step of deriving a coordinate component of a black on a color space for CMYK dot % for a printer associated with a predetermined representative coordinate in the color space for CMYK dot % for printing, on the representative coordinate, based on a printing profile and a printer profile; a second step of deriving a coordinate component of the black on the color space for CMYK dot % for a printer associated with coordinates other than the representative coordinate, based on the coordinate component of the black associated with the representative coordinate; and a step of deriving coordinate components of cyan, magenta and yellow on the color space for CMYK dot % for a printer, on the coordinates corresponding to the coordinate components derived in the first and second steps, based on the derived coordinate components of the black, the first and second color conversion definitions.

8 Claims, 10 Drawing Sheets

COLOR CONVERSION DEFINITION CREATING METHOD, COLOR CONVERSION DEFINITION CREATING APPARATUS, AND COLOR CONVERSION DEFINITION CREATING PROGRAM STORAGE MEDIUM

BACKGROUND OF THE INVENTION

1. Field of the Invention

The present invention relates to a color conversion definition creating apparatus for creating a color conversion definition defining a coordinate conversion in a mutual relationship between two color spaces.

2. Description of the Related Art

Hitherto, when a color-printing machine is used to perform a color image printing, it is performed prior to the color image printing that a color printer and the like is used to create a proof image which is extremely similar in color to an image to be printed in the color-printing machine. When the color printer and the like is used to create the proof image, there is derived a printing profile (a color conversion definition) describing a relation between image data and colors of actual printed matters, associated with using conditions, such as a type of a printing machine of interest, sorts of ink to be used in the printing machine, and sheet quality of sheets to be subjected to printing, which will be referred to as printing conditions. Further, there is also derived a printer profile (a color conversion definition) describing a relation between image data and colors of images actually printed out, associated with using conditions, such as a type of a printer, using conditions of the printer, which will be referred to as print conditions. The image data for printing is converted into the image data for a printer in accordance with a combined color conversion definition wherein the printing profile is combined with the printer profile, so that a proof image is created in accordance with the image data for a printer thus converted. In this manner, it is possible to create the proof image, which is coincident with the actual printed matter in color to some extent.

By the way, any colors of the color printed matter can be implemented in principle by a combination of three colors of C (cyan), M (magenta), and Y (yellow). However, inks associated with those three colors do not always have ideal spectral characteristics. For this reason, in the usual printing, a color printed matter is created with four colors including K (black). Therefore, in order to create a proof image with greater accuracy, it often happens that CMYK four colors are used also in a printer for crating a proof image.

Thus, in the event that an image of the printed matter and the proof image are created with CMYK four colors, the printing profile and the printer profile define a conversion relation between four-dimensional data of CMYK and three-dimensional data of calorimetric values, such as L*a*b* (hereinafter, it is simply denoted in form of Lab). The combined color conversion definition defines four-dimensional data of CMYK for printing and four-dimensional data of CMYK for a printer.

In the event that the combined color conversion definition is created, four-dimensional data of CMYK for printing and four-dimensional data of CMYK for a printer are associated with one another via three-dimensional data of calorimetric values. Since a degree of freedom in four-dimensional data of CMYK is higher than that of three-dimensional data of calorimetric values, it is impossible to determine uniquely the combined color conversion definition unless some restriction is applied to four-dimensional data of CMYK. In view of the foregoing, according to the prior art, there is proposed such a restriction that a K-component in four-dimensional data of CMYK is saved.

A restriction of saving the K-component is effective in the event that a density of ink of K-color in a printing machine is close to a density of ink of K-color in a printer. However, in the event that those densities are greatly different from each other, a printed matter by a proof image is low in accuracy of reproduction of color, and thus it would cause such a problem that an atmosphere in looking at the proof image is different from an atmosphere of the printed matter. In addition, as color reproduction ability in a printer, although there is left scope to bring a color of the proof image close to a color of the printed matter, it is difficult to make good use of the color reproduction ability.

On the other hand, in the event that good use of the color reproduction ability is regarded as important and the K-component is established without any restriction, it requires a great deal of time and labor to determine a suitable association. This would make it difficult to create the combined color conversion definition.

Here, while the explanation is made referring to a printing machine and a printer by way of example, the above-mentioned problems are raised in general when the combined color conversion definition defining the conversion relation between the four-dimensional data for CMYK is created via the three-dimensional color space.

SUMMARY OF THE INVENTION

In view of the foregoing, it is an object of the present invention to provide color conversion definition creating method, color conversion definition creating apparatus, and a color conversion definition creating program storage medium storing a color conversion definition creating program, which are capable of easily creating a combined color conversion definition high in color reproduction.

To achieve the above-mentioned object, the present invention provides a color conversion definition creating method of creating a combined color conversion definition defining a coordinate conversion between coordinates on color spaces in accordance with a first color conversion definition defining a coordinate conversion between coordinates on a first color space having coordinate axes associated with four colors of cyan, magenta, yellow and black, respectively, and coordinates on a predetermined second color space, and a second color conversion definition defining a coordinate conversion between coordinates on a third color space having coordinate axes associated with four colors of cyan, magenta, yellow and black, respectively, and the coordinates on the second color space, said combined color conversion definition defining a coordinate conversion between coordinates on the first color space and coordinates on the third color space, said color conversion definition creating method comprising:

a first black component derivation step of deriving a coordinate component of the black on the third color space associated with a predetermined representative coordinate in the first color space, on the representative coordinate, in accordance with the first color conversion definition and the second color conversion definition;

a second black component derivation step of deriving a coordinate component of the black on the third color space associated with other coordinates excepting the representative coordinate in the first color space, in accordance with the coordinate component of the black on the third color space associated with the representative coordinate; and an out of black component derivation step of deriving coordinate components of cyan, magenta and yellow on the third color space, on the coordinates wherein the coordinate component of the black on the third color space is derived in said first black component derivation step and said second black component derivation step, in accordance with the coordinate component of the black derived, the first color conversion definition and the second color conversion definition.

Here, "deriving" means derivation using a predetermined computation expression, logic and algorithm, and excepting that fixed values and an arbitrary value are adopted without logic.

According to the color conversion definition creating method of the present invention, in the first black component derivation step, there is derived a coordinate component of the black on the third color space as to only the representative coordinate in the first color space. This feature makes it possible to derive a suitable coordinate component for black in short time. In the second black component derivation step, there is derived a coordinate component of the black on the third color space in accordance with the coordinate component of the black on the third color space associated with the representative coordinate. And in the out of black component derivation step, there is derived coordinate components of cyan, magenta and yellow on the third color space in accordance with the coordinate component of the black. Thus, it is possible to readily create the combined profile, which is high in color reproduction quality.

In the color conversion definition creating method according to the present invention as mentioned above, it is preferable that said first black component derivation step comprises:

a search step of searching, under condition that the coordinate component of the black is fixed, the coordinates on the third color space wherein the second color conversion definition applies an association to coordinates close to the coordinates on the second color space wherein the first color conversion definition applies an association to the representative coordinate; and a fixed component alteration step for altering the coordinate component of the black to be fixed in said search step in accordance with a search result by said search step.

Repetition of the search step and the fixed component alteration step makes it possible to readily and surely determine a suitable coordinate component for black.

Further, in the color conversion definition creating method according to the present invention as mentioned above, it is preferable that said representative coordinate is a coordinate of a vertex in a color space of a cube-like configuration wherein cyan, magenta and yellow are variables, in which a coordinate component of the black in the first color space is fixed.

Such a vertex is a point corresponding to the edge of the gamut wherein the coordinate component of the black is fixed. Accordingly, the use of coordinates of the vertex makes it possible to readily create the combined color conversion definition with great accuracy.

To achieve the above-mentioned object, the present invention provides a color conversion definition creating apparatus for creating a combined color conversion definition defining a coordinate conversion between coordinates on color spaces in accordance with a first color conversion definition defining a coordinate conversion between coordinates on a first color space having coordinate axes associated with four colors of cyan, magenta, yellow and black, respectively, and coordinates on a predetermined second color space, and a second color conversion definition defining a coordinate conversion between coordinates on a third color space having coordinate axes associated with four colors of cyan, magenta, yellow and black, respectively, and the coordinates on the second color space, said combined color conversion definition defining a coordinate conversion between coordinates on the first color space and coordinates on the third color space, said color conversion definition creating apparatus comprising:

a first black component derivation section for deriving a coordinate component of the black on the third color space associated with a predetermined representative coordinate in the first color space, on the representative coordinate, in accordance with the first color conversion definition and the second color conversion definition;

a second black component derivation section for deriving a coordinate component of the black on the third color space associated with other coordinates excepting the representative coordinate in the first color space, in accordance with the coordinate component of the black on the third color space associated with the representative coordinate; and an out of black component derivation section for deriving coordinate components of cyan, magenta and yellow on the third color space, on the coordinates wherein the coordinate component of the black on the third color space is derived in said first black component derivation section and said second black component derivation section, in accordance with the coordinate component of the black derived, the first color conversion definition and the second color conversion definition.

To achieve the above-mentioned object, the present invention provides a color conversion definition creating program storage medium storing a color conversion definition creating program which causes a computer to operate as a color conversion definition creating apparatus, when said color conversion definition creating program is incorporated into the computer and executed, said color conversion definition creating program comprising:

a first black component derivation section for deriving a coordinate component of the black on the third color space associated with a predetermined representative coordinate in the first color space, on the representative coordinate, in accordance with the first color conversion definition and the second color conversion definition;

a second black component derivation section for deriving a coordinate component of the black on the third color space associated with other coordinates excepting the representative coordinate in the first color space, in accordance with the coordinate component of the black on the third color space associated with the representative coordinate; and an out of black component derivation section for deriving coordinate components of cyan, magenta and yellow on the third color space, on the coordinates wherein the coordinate component of the black on the third color space is derived in said first black component derivation section and said second black component derivation section, in accordance with the coordinate component of the black derived, the first color conversion definition and the second color conversion definition.

Incidentally, with respect to the color conversion definition creating apparatus and the color conversion definition creating program storage medium storing a color conversion definition creating program according to the present invention, here, there are simply shown their basic forms. It is noted, however, that the color conversion definition creating apparatus and the color conversion definition creating program storage medium of the present invention includes various modifications of the color conversion definition creating apparatus and the color conversion definition creating program storage medium corresponding to the various modifications of the above-mentioned color conversion definition creating method, respectively.

In the color conversion definition creating apparatus and the color conversion definition creating program according to the present invention, as to names for the structural elements of those, the same names are applied, such as the first black component derivation section and the out of black component derivation section. It is noted, however, that in case of the color conversion definition creating program, the software is concerned, and in case of the color conversion definition creating apparatus, the hardware is concerned.

Further, it is acceptable that the structural element such as the first black component derivation section, which constitutes the color conversion definition creating program referred to in the present invention, is one in which a function of one structural element is implemented by a single program component, or one in which a function of one structural element is implemented by a plurality of program components, or one in which functions of a plurality of structural elements are implemented by one program component. It is acceptable that those structural elements are ones wherein such functions are executed by oneself, or ones wherein such functions are executed through issuing instructions to program components and other programs incorporated into a computer.

DETAILED DESCRIPTION OF PREFERRED EMBODIMENTS

Embodiments of the present invention will be described with reference to the accompanying drawings.

Figure 1:
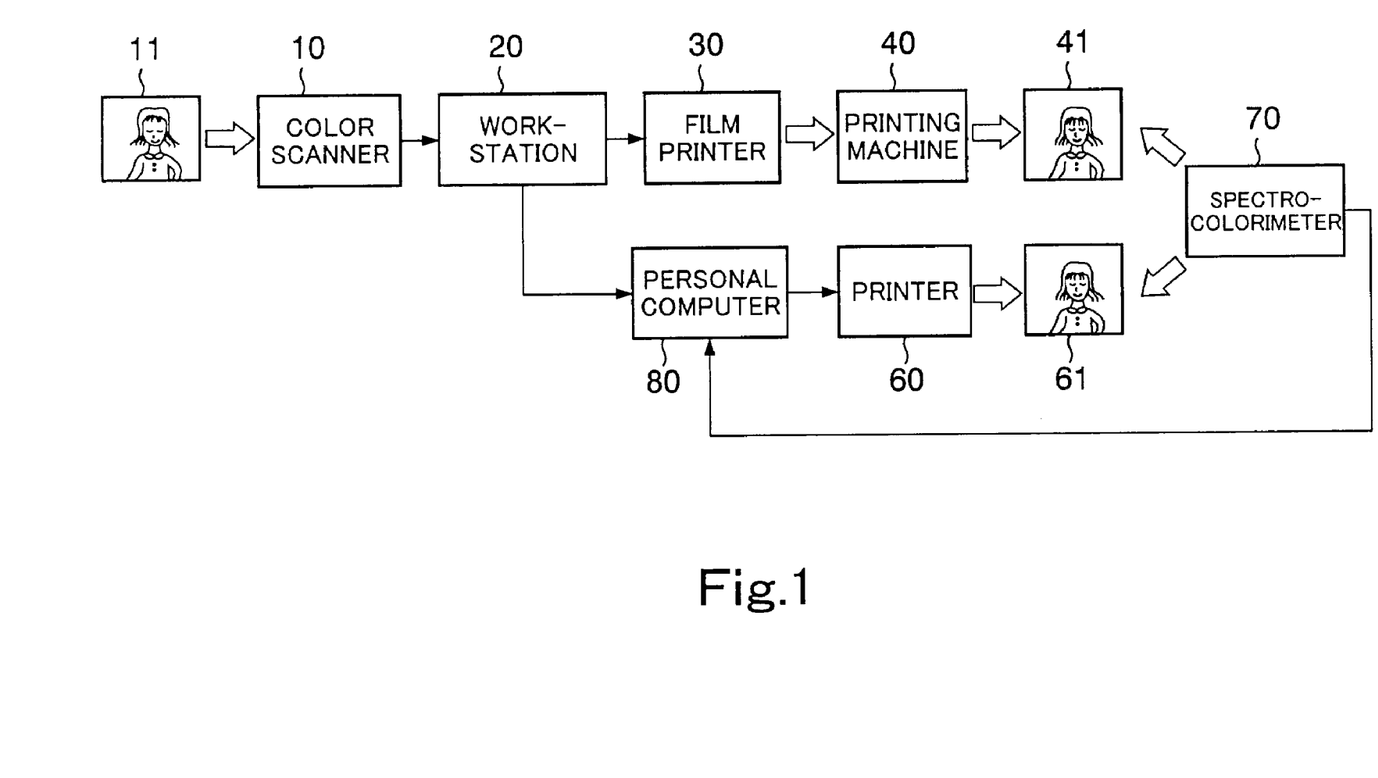
FIG. 1 is a construction view of a printing and proof image creating system to which an embodiment of the present invention is applied.

FIG. 1 is a construction view of a printing and proof image creating system to which an embodiment of the present invention is applied.

A color scanner 10 reads an original image 11 to generate color separation image data for CMYK four colors representative of the original image 11. The color separation image data for CMYK is fed to a workstation 20. In the workstation 20, an operator performs an electronic page make-up in accordance with fed image data to generate image data representative of an image for printing. The image data for printing is fed to a film printer 30 when the printing is performed. The film printer 30 creates film original plates for printing for CMYK in accordance with the fed image data.

From the film original plates for printing, machine plates are created, and the machine plates thus created are loaded onto a printing machine 40. Ink is applied to the machine plates loaded onto the printing machine 40. The applied ink is transferred to a paper for printing to form a printed image 41 on the paper.

A series of work that the film printer 30 is used to create the film original plates, a machine plate is created and is loaded onto the printing machine 40, and ink is applied to the machine plate to perform a printing on a sheet, is a large-scale work, and it costs a great deal. For this reason, prior to the actual printing work, a printer 60 is used to create a proof image 61 in accordance with a manner as set forth below, so that finish of the printed image 41 is confirmed beforehand.

When the proof image 61 is created, the image data, which is created by the electronic page make-up on the workstation 20, is fed to a personal computer 80. Here, the image data fed to the personal computer 80 is description language data described in a so-called PDL (Page Description Language). In the personal computer 80, a so-called RIP (Raster Image Processor) is used to convert the received image data into image data for CMYK four colors developed into a bit map. The image data for CMYK four colors is substantially same as the image data for printing fed to the film printer 30.

The image data for CMYK four colors for printing is converted into image data for CMYK four colors suitable for the printer 60, while a color conversion definition having a format of LUT (Look Up Table) is referred to in the personal computer 80. The printer 60 receives the image data for CMYK four colors for the printer to create a proof image 61 in accordance with the received image data for CMYK four colors for the printer.

Confirmation of the proof image thus created makes it possible to confirm finish of printing beforehand.

A degree of color matching between the image 41 obtained through printing by the printing machine 40 and the proof image 61 obtained by the printer 60 is determined by the color conversion definition in the personal computer 80. A spectrocolorimeter 70 and the personal computer 80 are associated with creation of the color conversion definition.

A feature of the embodiment of the present invention in the printing and proof image creating system shown in FIG. 1 relates to processing contents to be executed in the personal computer 80. Accordingly, hereinafter, there will be explained the personal computer 80.

Figure 2:
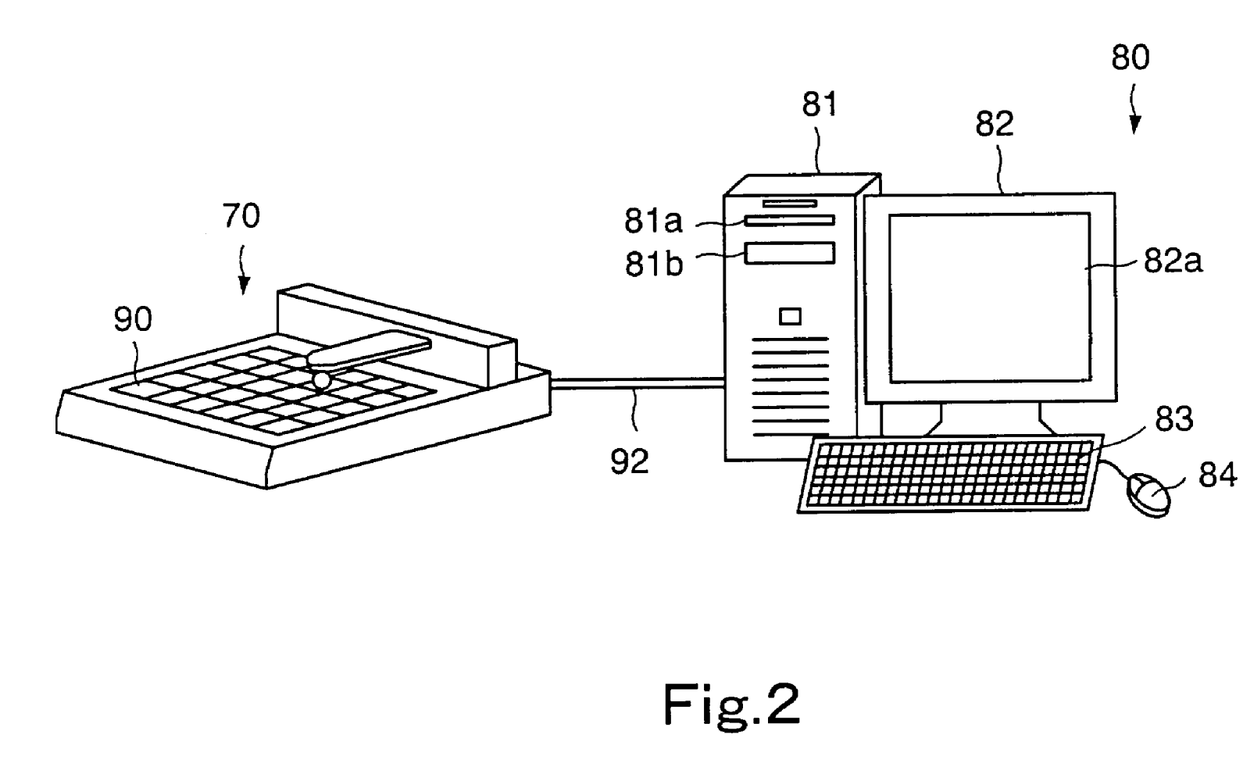
FIG. 2 is a perspective view of a spectrocolorimeter and a personal computer.
Figure 3:
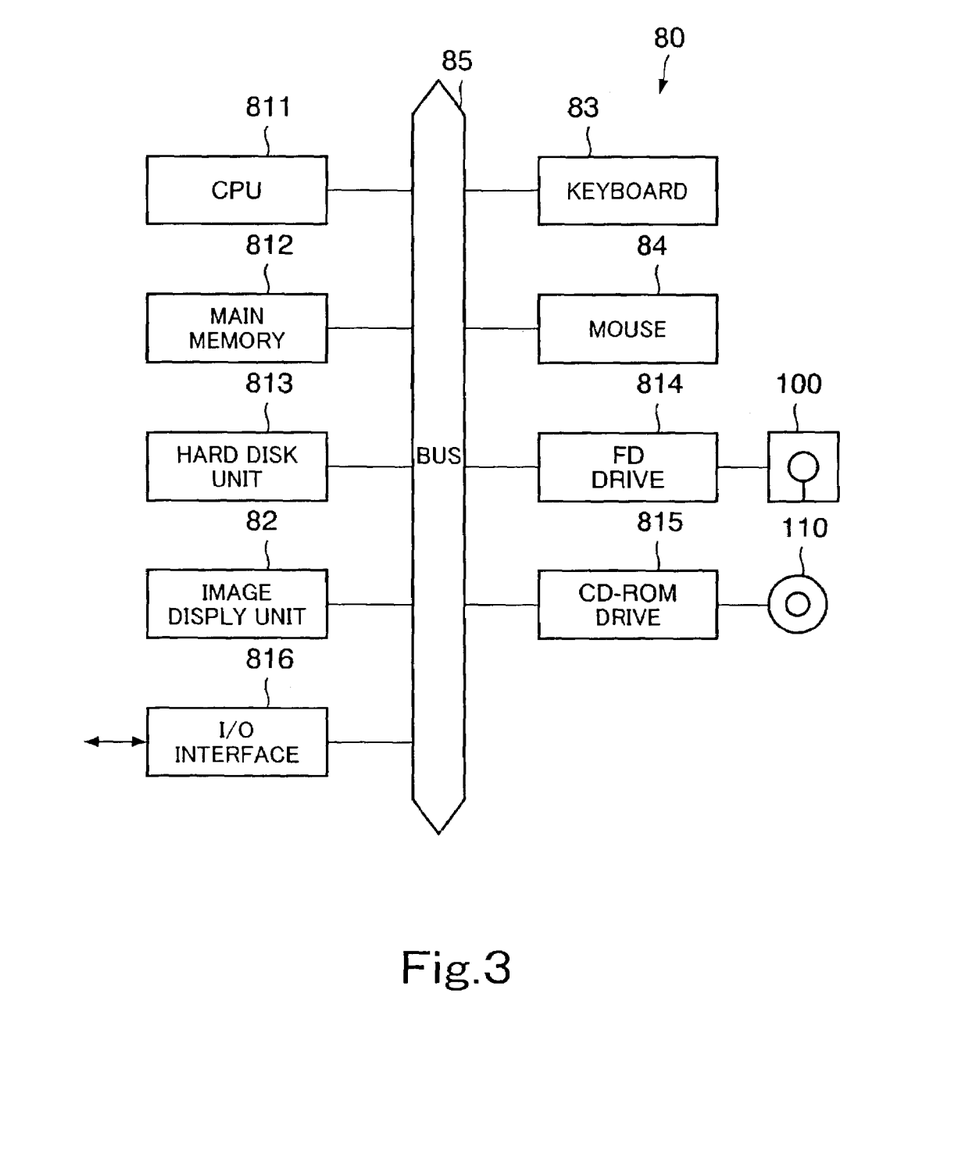
FIG. 3 is a hardware structural view of the personal computer.
Figure 4:
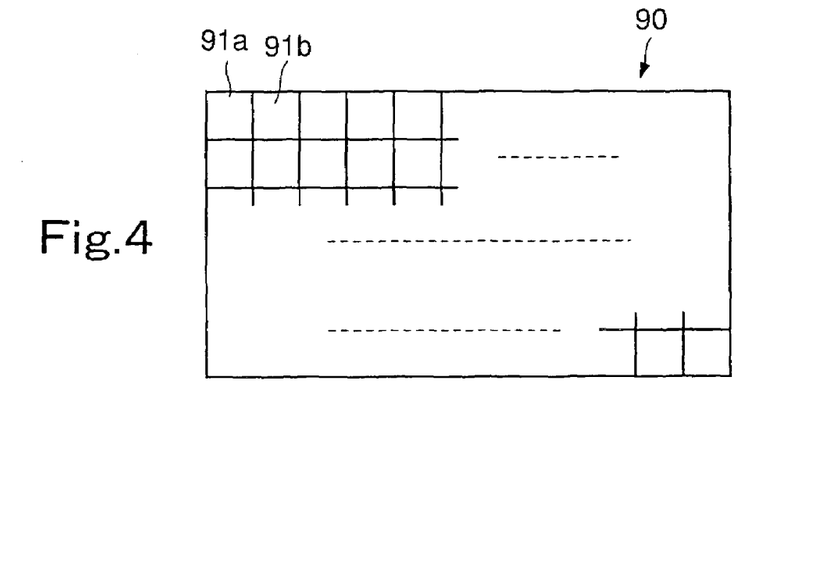
FIG. 4 is a typical illustration of a color chart.

FIG. 2 is a perspective view of a spectrocolorimeter and a personal computer. FIG. 3 is a hardware structural view of the personal computer. FIG. 4 is a typical illustration of a color chart.

The spectrocolorimeter 70 shown in FIG. 2 is loaded with a color chart 90 in which a plurality of color patches 91a, 91b, . . . , as shown in FIG. 4, so that calorimetric values (XYZ values) on the plurality of color patches 91a, 91b, . . . are measured. Colorimetric data representative of the calorimetric values of the color patches obtained through measurement by the spectrocolorimeter 70 is fed via a cable 92 to the personal computer 80.

The color chart 90 is created by printing with the printing machine 40 shown in FIG. 1, or by printing output with the printer 60. The personal computer 80 recognizes color data (coordinates on a device color space: values for CMYK) associated with the color patches constructing the color chart 90, and creates a printing profile and a printer profile in accordance with color data for the respective color patches of the color chart 90 and the calorimetric data obtained by the spectrocolorimeter 70. Details of this respect will be explained later. Next, there will be explained a hardware structure of the personal computer 80.

The personal computer 80 comprises, on an external appearance, a main frame unit 81, an image display unit 82 for displaying an image on a display screen 82a in accordance with an instruction from the main frame unit 81, a keyboard 83 for inputting various sorts of information to the main frame unit 81 in accordance with a key operation, and a mouse 84 for inputting an instruction according to, for example, an icon and the like, through designation of an optional position on the display screen 82a, the icon and the like being displayed on the position on the display screen 82a. The main frame unit 81 has a flexible disk (FD) mounting slot 81a for mounting a flexible disk (FD), and a CD-ROM mounting slot 81b for mounting a CD-ROM.

The main frame unit 81 comprises, as shown in FIG. 3, a CPU 811 for executing a various types of program, a main memory 812 in which a program stored in a hard disk unit 813 is read out and developed for execution by the CPU 811, the hard disk unit 813 for saving various types of programs and data, an FD drive 814 for accessing a flexible disk 100 mounted thereon, a CD-ROM drive 815 for accessing a CD-ROM 110 mounted thereon, and an I/O interface 816 connected to the spectrocolorimeter 70 (cf. FIG. 1 and FIG. 2) to receive calorimetric values from the spectrocolorimeter 70. These various types of elements are connected via a bus 85 to the image display unit 82, the keyboard 83 and the mouse 84.

The CD-ROM 110 stores therein a profile creating program which causes the personal computer 80 to create a profile. The CD-ROM 110 is mounted on the CD-ROM drive 815 so that the profile creating program, which is stored in the CD-ROM 110, is up-loaded on the personal computer 80 and is stored in the hard disk unit 813.

Next, there will be explained a method of creating a profile in the personal computer 80.

First, there will be explained a method of creating a printing profile.

In the workstation 20 shown in FIG. 1, dot % data for CMYK four colors, sequentially varied, for example, at intervals of 0%, 10% . . . , 100%, is generated, and the color chart 90 (cf. FIG. 4) based on dot % data thus generated is created in accordance with the above-mentioned printing procedure. While the image 41 shown in FIG. 1 is not representative of the color chart, the spectrocolorimeter 70 is used to measure the color patches 91a, 91b, . . . , which constitute the color chart 90, assuming that instead of the image 41, the color chart 90 shown in FIG. 4 is printed. Thus, there is constructed a printing profile representative of the association coordinates on a color space for CMYK four colors and coordinates on a calorimetric color space.

Figure 5:
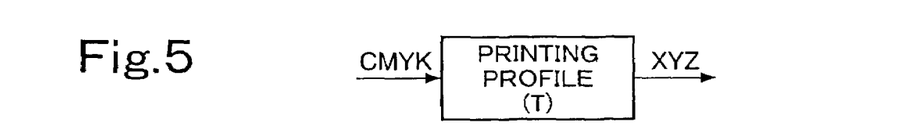
FIG. 5 is a conceptual view of a printing profile.

FIG. 5 is a conceptual view of a printing profile.

The printing profile shown in FIG. 5 receives image data defined by CMYK (an example of the target device color space referred to in the present invention) to convert the received image data for CMYK into image data defined by XYZ (an example of the calorimetric color space referred to in the present invention).

Next, there will be explained a method of creating a printer profile.

Incidentally, here, it is assumed that the printer profile is created by a maker of the printer and is delivered together with the printer. Accordingly, here, while there is no need to create newly the printer profile, hereinafter, there will be explained a basic creating method in the event that the printer profile is created newly.

A method of creating the printer profile is the same as a method of creating the printing profile excepting that an output device for outputting a color chart is a printer but not a printing machine. That is, here, the personal computer 80 shown in FIG. 1 is used to generate dot % data for CMYK four colors, sequentially varied, for example, at intervals of 0%, 10%, . . . , 100%. The dot % data thus generated is transmitted to the printer 60. The printer 60 prints out a color chart in accordance with the dot %. Incidentally, it is acceptable that the dot % sequentially varies at intervals of that other than 10%. For the sake of convenience, however, it is assumed that dot % data of intervals of 10% is used.

While the image 61 shown in FIG. 1 is not an image representative of a color chart, it is assumed that the printer 60 outputs the same type of color chart as the color chart created through printing by the printing machine 40 for the purpose of creation of the printing profile, for instance, instead of the image 61, and the spectrocolorimeter 70 is used to measure the color patches of the color chart. Thus, there is constructed a printer profile representative of the association between coordinates values on a color space (an example of the proofer color space referred to in the present invention) for CMYK four colors and coordinates values on a calorimetric color space (the XYZ space), with respect to the printer 60.

Figure 6:
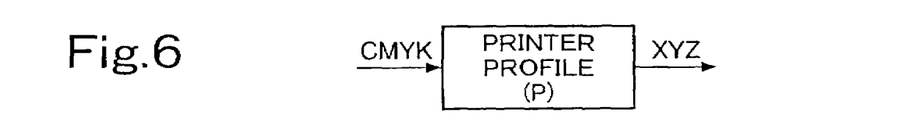
FIG. 6 is a conceptual view of a printer profile.

FIG. 6 is a conceptual view of a printer profile.

The printer profile shown in FIG. 6 receives dot % data for CMYK to convert the received dot % data for CMYK into colorimetric data for XYZ. Here, the printer profile for converting the dot % data for CMYK into the colorimetric data for XYZ is denoted by P, and reversely, the printer profile for converting the calorimetric data for XYZ into the dot % data for CMYK is denoted by $P^{-1}$.

While it is explained that the printer 60 outputs an image in accordance with the dot % data for CMYK, also with respect to a printer for outputting an image according to data for RGB for instance, it is likely possible to create a printer profile suitable for the printer in such a manner that the personal computer 80 is used to generate data defined with an RGB space, and outputs a color chart.

Here, however, there will be explained the present embodiment wherein there is used the printer 60 for outputting an image in accordance with the dot % data for CMYK.

Figure 7:
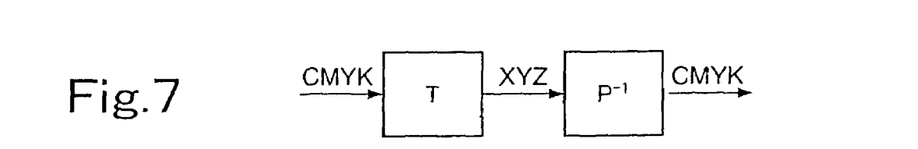
FIG. 7 is a view of a combined profile in which a printing profile is combined with a printer profile.

FIG. 7 is a view of a combined profile in which a printing profile is combined with a printer profile.

The combined profile shown in FIG. 7 converts dot % data for CMYK for printing into calorimetric data for XYZ in accordance with a printing profile T, and then converts the calorimetric data for XYZ into dot % data for CMYK for printer in accordance with a printer profile $P^{-1}$. Thus, the use of the printer 60 makes it possible to output a proof image having-the same color as the printing in accordance with the dot % data for CMYK for printer. The combined profile, which consists of a combination of the printing profile T and the printer profile $P^{-1}$, converts the image data defined with the CMYK color space for printing into the image data defined with the CMYK color space for a printer. The combined profile corresponds to an example of the combined color conversion definition referred to in the present invention.

After the personal computer 80, which constitutes the printing and proof image creating system, as shown in FIG. 1, is used to create the combined profile and convert the image data described in the PDL fed from the workstation 20 into image data for CMYK, the image data for CMYK is converted into image data for CMYK for a printer using the combined profile, and the printer 60 is used to print out an image in accordance with the image data for CMYK for a printer, so that a proof image to the image for printing is created.

In the event that a density of ink for printer is close to a density of ink for printing, a reproducible color gamut for a printing image is similar to a reproducible color gamut for a proof image. Accordingly, when a combined profile is created, it is possible to divert a K-color component of dot % data for CMYK for printing to a K-color component of dot % data for CMYK for a printer.

Figure 8:
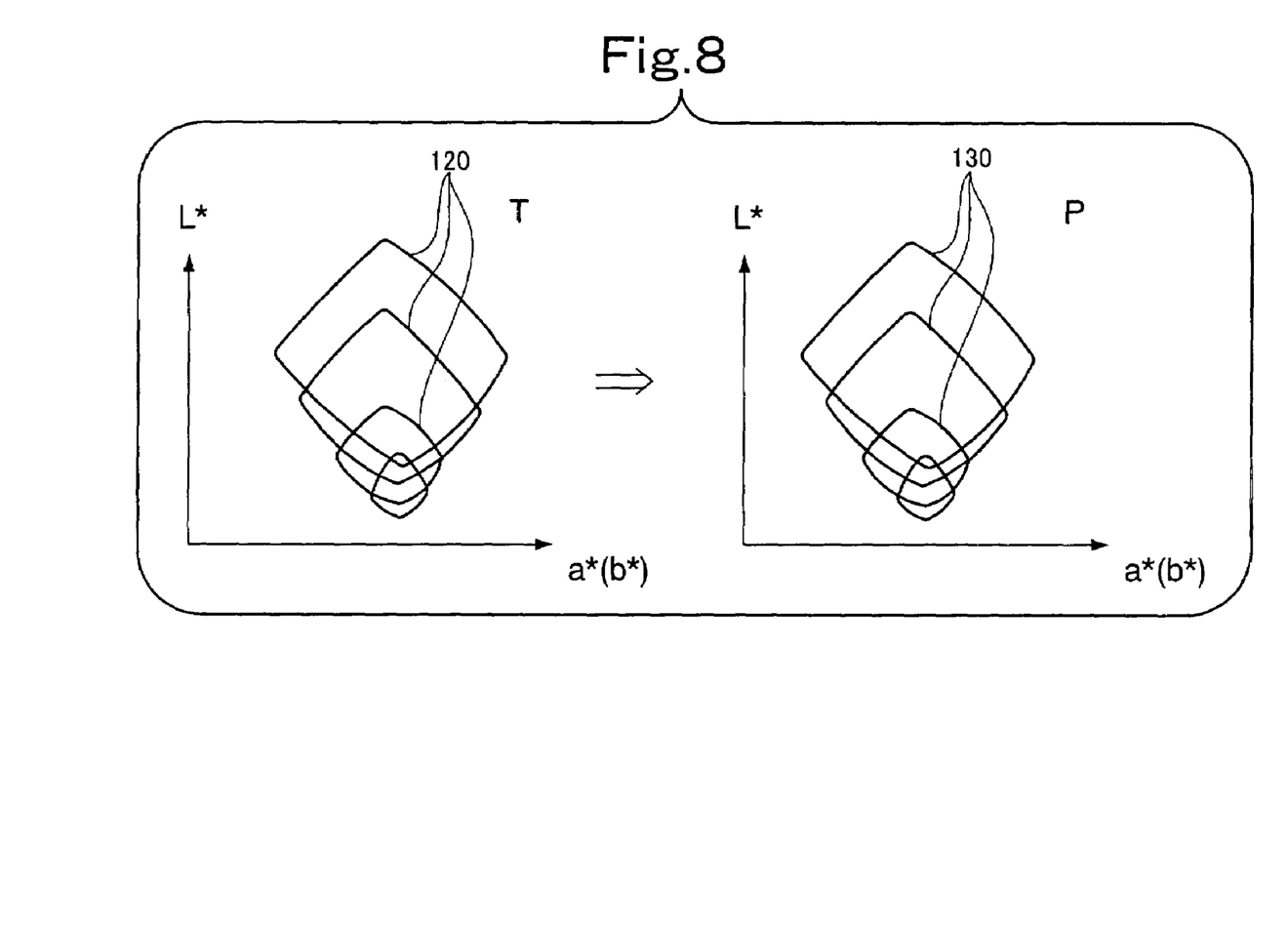
FIG. 8 is a view showing, by way of example, color reproduction areas of a printing image and a proof image in the event that a density of ink for a printer is close to a density of ink for a printing.

FIG. 8 is a view showing, by way of example, color gamut of a printing image and color gamut of a proof image in the event that a density of ink for a printer is close to a density of ink for a printing.

Two graphs shown in FIG. 8 show each color gamut on a Lab color space, which is obtained through coordinate conversion of XYZ color conversion. The horizontal axis of each of the graphs denotes a* axis and b* axis, and the vertical axis denotes L* axis.

The graph of the left side of FIG. 8 shows a series of color reproduction ranges 120, which is obtained in accordance with the above-mentioned printing profile T, when K-color component of dot % for CMYK for printing is fixed on a series of dot % such as 0%, 10% ..., 100%. The color gamut of the printing image is considered as a set of the color reproduction ranges 120.

On the other hand, the graph of the right side of FIG. 8 shows a series of color reproduction ranges 130, which is obtained in accordance with the above-mentioned printer profile P, when K-color component of dot % data for CMYK for a printer is fixed on a series of dot % such as 0%, 10% ..., 100%. The color gamut of the proof image is considered as a set of the color reproduction ranges 130.

The color reproduction ranges 120 shown in the graph of the left side are greatly similar to the color reproduction ranges 130 shown in the graph of the right side, since the K-color component is common to one another. Thus, a color of the printing image belonging to one color reproduction range 120 is sufficiently reproducible in color within the color reproduction ranges 130 of the proof which is common to the color reproduction range 120 in the K-color component.

To the contrary, in the event that a density of ink for a printer is greatly different from a density of ink for printing, a color gamut of the printing image is also greatly different from a color gamut of the proof image. Accordingly, in the event that a K-color component of dot % data for CMYK for printing is diverted to a K-color component of dot % data for CMYK for printer to create a combined profile, the following inconvenience will occur.

Figure 9:
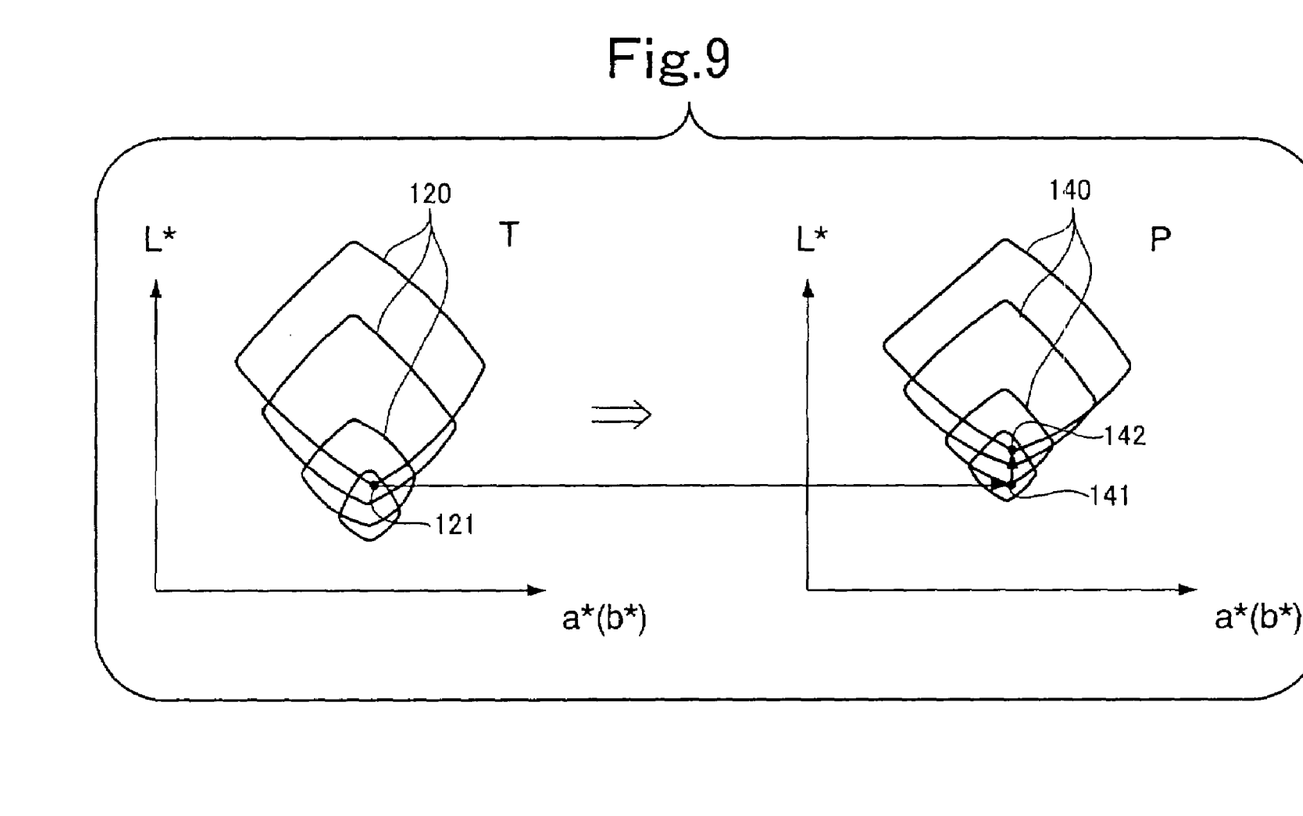
FIG. 9 is a view showing, by way of example, color reproduction areas of a printing image and a proof image in the event that a density of ink for a printer is greatly different from a density of ink for a printing.

FIG. 9 is a view showing, by way of example, color reproduction areas of a printing image and a proof image in the event that a density of ink for a printer is greatly different from a density of ink for a printing.

Two graphs shown in FIG. 9 also show each color gamut on the Lab color space. The horizontal axis of each of the graphs denotes a* axis and b* axis, and the vertical axis denotes L* axis.

The graph of the left side of FIG. 9 shows a series of color reproduction ranges 120, also shown in the graph of the left side of FIG. 8.

On the other hand, the graph of the right side of FIG. 9 also shows a series of color reproduction ranges 140, which is also obtained in accordance with the above-mentioned printer profile P, when K-color component of dot % data for CMYK for a printer is fixed on a series of dot % such as 0%, 10% ..., 100%. However, since a density of ink for a printer is greatly different from a density of ink for a printing, the color reproduction ranges 120 for printing are greatly different from the color reproduction ranges 140 for a proof, even if they are common to one another in K-color component of dot % data.

For this reason, there occurs such an inconvenience that a color 121 close to the end of one color reproduction range 120 of the color reproduction ranges 120 for printing is merely expressed by only a color 142 that is greatly different from the color 121, when K-color component of dot % data for printing is used as K-color component of dot % data for a printer, although the same color 141 exists in the color reproduction area when the color reproduction area of the proof image is viewed as a whole, and in principle it is reproducible with the proof image.

Accordingly, when the personal computer 80, which constitutes the printing and proof image creating system, as shown in FIG. 1, is used to create the combined profile, an embodiment of the present invention, which will be explained hereinafter, is applied to create a combined profile high in color reproduction quality.

Figure 10:
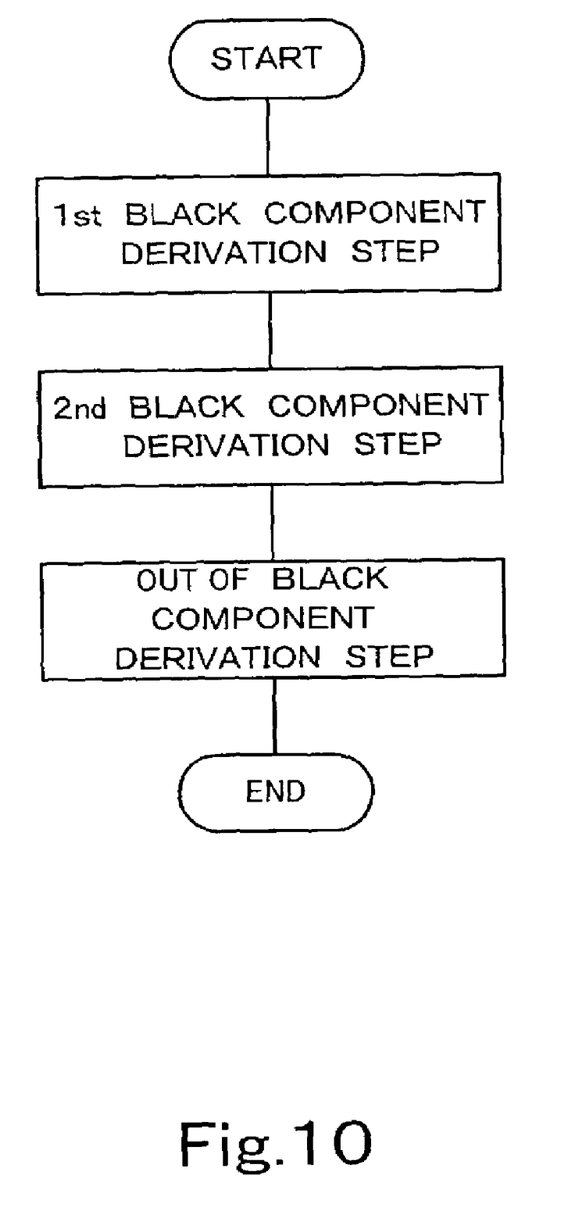
FIG. 10 is a flowchart useful for understanding one embodiment of a color conversion definition creating method.

FIG. 10 is a flowchart useful for understanding one embodiment of a color conversion definition creating method.

A color conversion definition creating method according to the present embodiment comprises a first black component derivation step, a second black component derivation step, and an out of black component derivation step, which are executed by the personal computer 80 shown in FIGS. 1, 2 and 3.

According to the first black component derivation step in the present embodiment, with respect to a predetermined representative coordinate in a color space for CMYK dot % for printing, a coordinates component of black on a color space for CMYK dot % for a printer associated with the representative coordinate is derived in accordance with the printing profile and the printer profile.

According to the second black component derivation step in the present embodiment, a coordinates component of black on a color space for CMYK dot % for a printer associated with other coordinates excepting the representative coordinate is derived in accordance with a coordinates component of black on a color space for CMYK dot % for a printer associated with the representative coordinate.

According to the out of black component derivation step in the present embodiment, with respect to the respective coordinates wherein the coordinates components of black on a color space for CMYK dot % for a printer are derived in the first black component derivation step and the second black component derivation step are derived, coordinates components of cyan, magenta, and yellow on a color space for CMYK dot % for a printer are derived in accordance with the derived coordinates components for black, a printing profile and a printer profile.

Detailed contents of the above-mentioned steps will be described later.

Figure 11:
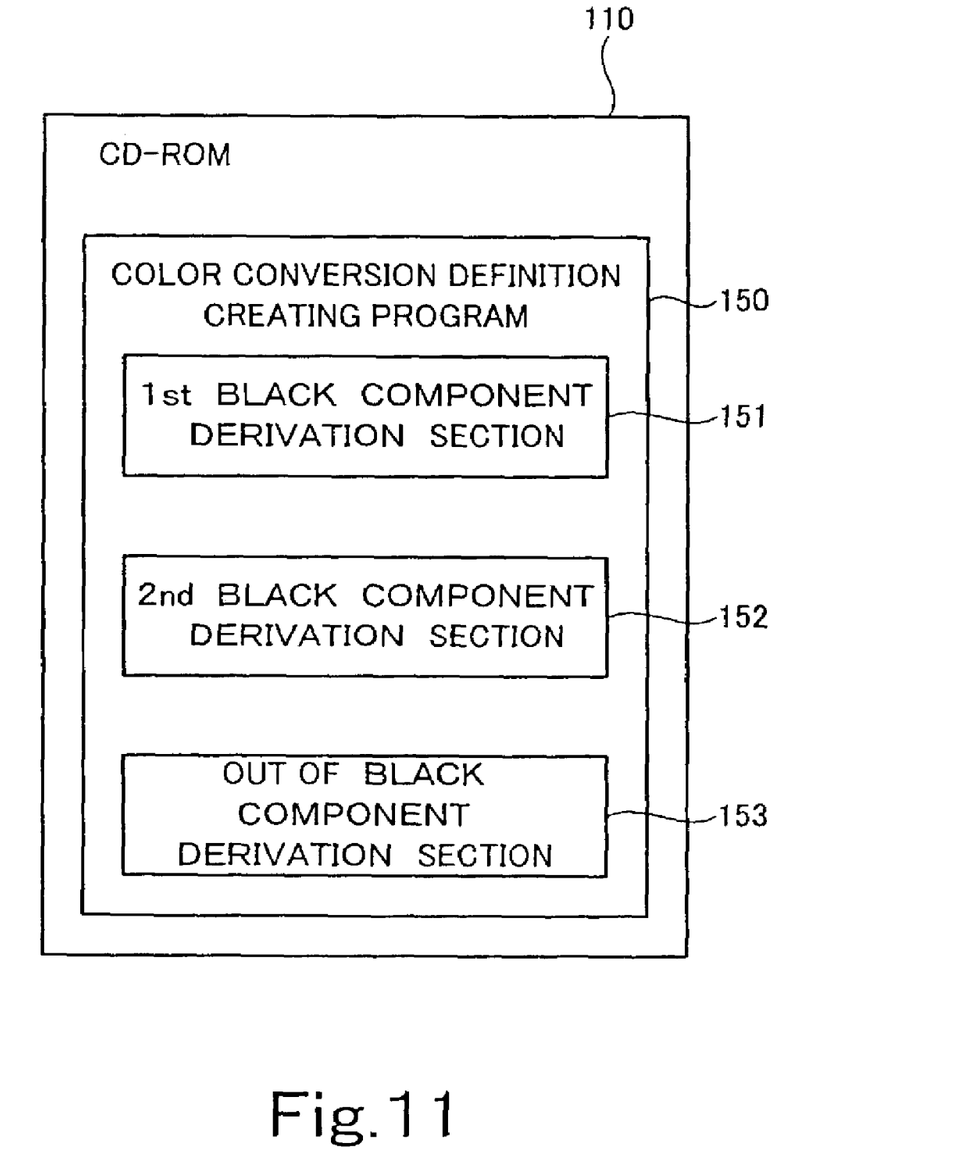
FIG. 11 is a view useful for understanding a color conversion definition creating program stored in a color conversion definition creating program storage medium according to an embodiment of the present invention.

FIG. 11 is a view useful for understanding a color conversion definition creating program stored in a color conversion definition creating program storage medium according to an embodiment of the present invention.

Here, a color conversion definition creating program 150 is stored in CD-ROM 110.

The color conversion definition creating program 150 is executed in the personal computer 80 shown in FIGS. 1, 2 and 3, and causes the personal computer 80 to operate as a color conversion definition creating apparatus for creating the combined profile as shown in FIG. 7. The color conversion definition creating program 150 comprises a first black component derivation section 151, a second black component derivation section 152, and an out of black component derivation section 153.

The first black component derivation section 151 executes the first black component derivation step of the color conversion definition creating method shown in FIG. 10.

The second black component derivation section 152 executes the second black component derivation step of the color conversion definition creating method shown in FIG. 10.

The out of black component derivation section 153 executes the out of black component derivation step of the color conversion definition creating method shown in FIG. 10.

Figure 12:
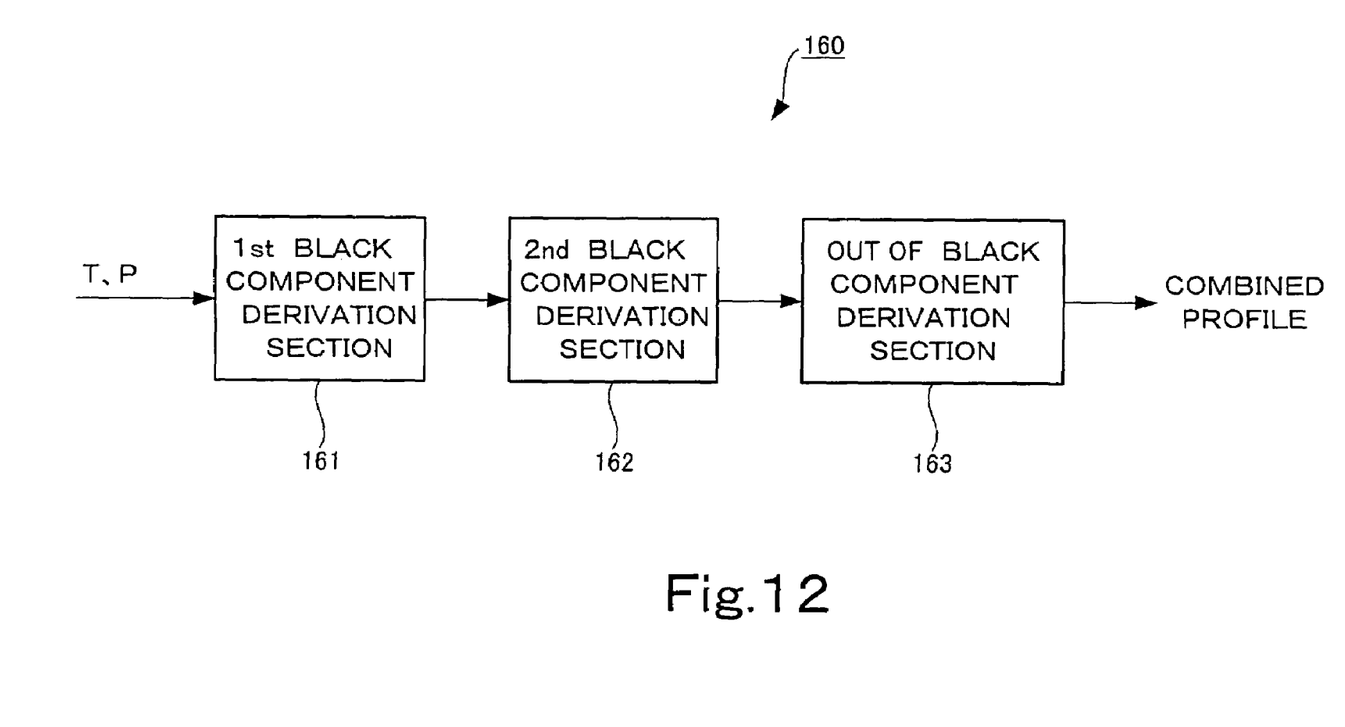
FIG. 12 is a functional block diagram useful for understanding one embodiment of a color conversion definition creating apparatus of the present invention.

FIG. 12 is a functional block diagram useful for understanding one embodiment of a color conversion definition creating apparatus of the present invention.

A color conversion definition creating apparatus 160 is implemented when the color conversion definition creating program 150 of FIG. 11 is installed in the personal computer 80 shown in FIGS. 1, 2 and 3, and is executed.

The color conversion definition creating apparatus 160 comprises a first black component derivation section 161, a second black component derivation section 162, and an out of black component derivation section 163. The first black component derivation section 161, the second black component derivation section 162, and the out of black component derivation section 163 correspond to the first black component derivation section 151, the second black component derivation section 152, and the out of black component derivation section 153, respectively, which constitute the color conversion definition creating program 150 shown in FIG. 11. But the elements of the color conversion definition creating apparatus 160 shown in FIG. 12 are constructed in combination of the hardware of the personal computer 80 shown in FIGS. 1, 2 and 3 with an OS (operating system) and an application program to be executed in the personal computer. To the contrary, the elements of the color conversion definition creating program shown in FIG. 11 are constructed with an application program.

Figure 13:
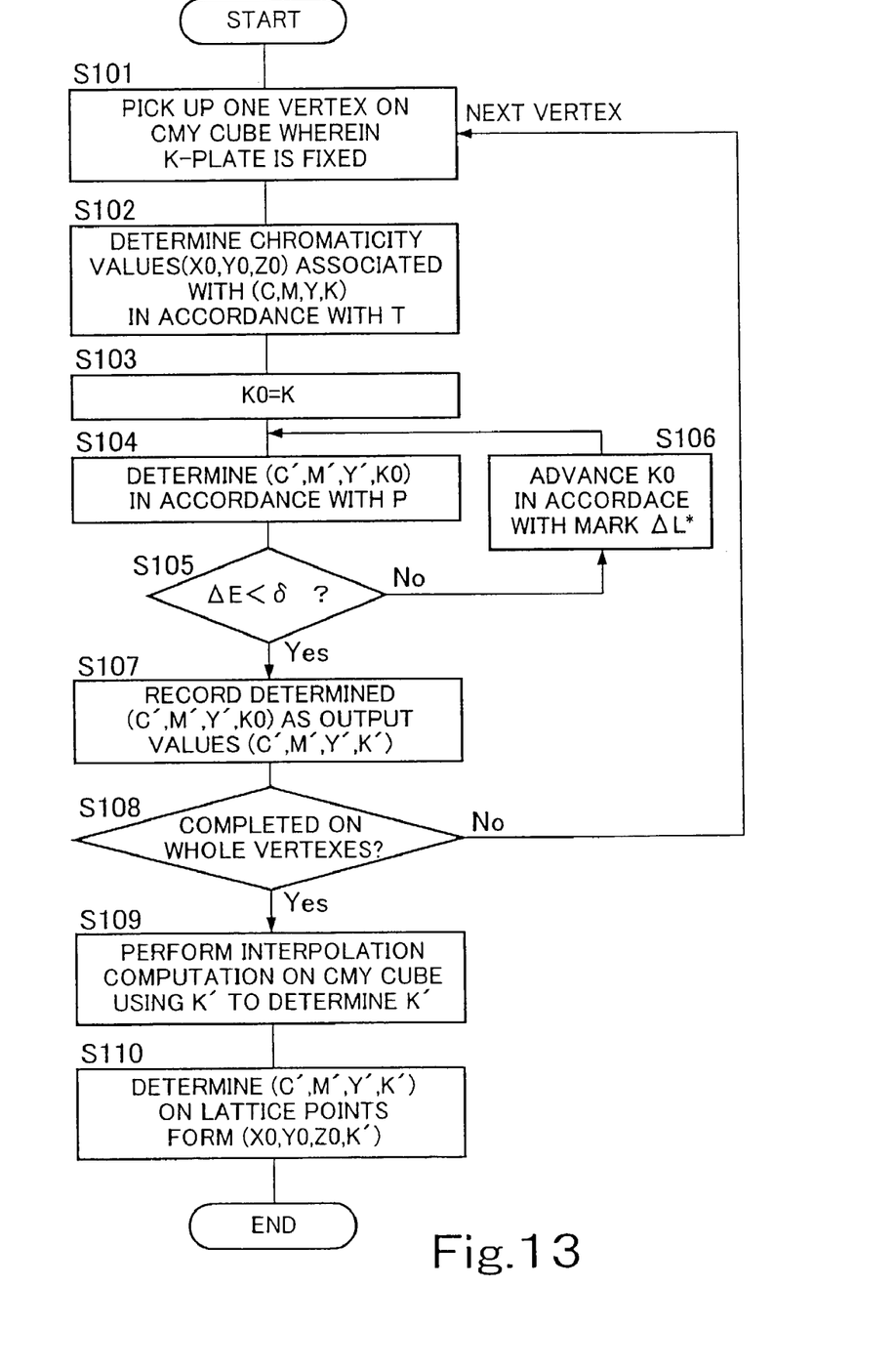
FIG. 13 is a flowchart useful for understanding details of a color conversion definition creating method.

FIG. 13 is a flowchart useful for understanding details of a color conversion definition creating method.

According to the flowchart shown in FIG. 13, the first black component derivation section shown in FIG. 10 is constructed with steps S101 to S108, and steps S109 and S110 correspond to the second black component derivation section and the out of black component derivation section, respectively.

Hereinafter, there will be explained the flowchart for the color conversion definition creating method.

According to the present embodiment, as the representative coordinates referred to in the present invention, there are adopted coordinates of vertexes in the CMYK color space of a cube-like configuration wherein cyan, magenta, and yellow are established as variables, when dot % for K-color in the color space for CMYK dot % for printing is fixed. As the fixed value of dot % for K-color, there is used a series of dot % of fixed values, for example, 0%, 10%, ..., 100%. Those vertexes correspond, in some meaning, to the limits of the color gamut of printing. Accordingly, adoption of coordinates of those vertexes as the representative coordinates referred to in the present invention makes it possible to effectively determine the combined profile with great accuracy.

In the step S101, one fixed value is optionally selected from among the series of dot % of fixed values to select one of eight vertexes in the CMY color space of a cube-like configuration corresponding to the fixed value. Coordinates of the selected one vertex is expressed by (C, M, Y, K).

Next, chromaticity values (X0, Y0, Z0) associated with the coordinates (C, M, Y, K) of the selected vertex are determined in accordance with the printing profile T (the step S102), and candidate K0 for dot % of K-color for a printer associated with the coordinates (C, M, Y, K) of the selected vertex is fixed on the K-color component (the step S103).

Next, of the CMYK dot % (C', M', Y', K0) for a printer including the candidate K0 for the fixed dot % in form of the K-color component, the CMYK dot % (C', M', Y', K0), wherein the color difference $\Delta E$ with the chromaticity values (X0, Y0, Z0) associated with the coordinates (C, M, Y, K) of the selected vertex is associated with the smallest chromaticity value, is determined in accordance with the printer profile P (the step S104). Accordingly, the step S104 corresponds to an example of the search step referred to in the present invention.

Thereafter, it is decided as to whether the color difference $\Delta E$ is smaller than a predetermined minor color difference $\delta$ (the step S105). When it is decided that the color difference $\Delta E$ is larger than the color difference $\delta$, it is regarded that the color reproduction quality is insufficient, and thus the candidate K0 for dot % of K-color is advanced in a direction of increment or decrement in accordance with a mark of $\Delta L^*$ indicative of insufficiency or excess (the step S106). That is, the step S105 and the step S106 constitute an example of the fixed component alteration step.

Repetition of the loop of the step S104 to the step S106 makes it possible to easily and surely determine a suitable value for K0.

In accordance with the decision of the step S105, when it is decided that the color difference $\Delta E$ is smaller than the color difference $\delta$, it is regarded that the color reproduction quality is sufficient and the process goes out of the loop of the steps S104 to S106, so that values of the CMYK dot % (C', M', Y', K0), which are determined by the loop, are recorded as output values (C', M', Y', K') to be associated with the coordinates (C, M, Y, K) of the selected vertex by the combined profile (the step S107). Incidentally, even if the color reproduction quality is insufficient, in the event that dot % of K-color reaches 0% or 100%, it is difficult to enhance the color reproduction quality further more, and thus also in this case, the process goes out of the loop and values of the CMYK dot % (C', M', Y', K0) are recorded.

Processing of the above-explained steps S101 to S107 is repeated until it is executed on all of the eight vertexes in the CMY color space of a series of cube-like configuration corresponding to the fixed values of the series of dot % for K-color (the step S108: No).

When the processing of the steps S101 to S107 is executed on all of the vertexes (the step S108: Yes), dot % K'i of K-color for a printer associated with coordinates of the lattice points existing as a lattice in the CMY color spaces of a series of cube-like configuration corresponding to the fixed values of the series of dot % for K-color is computed in accordance with an interpolation computation based on dot % K' of K-color for a printer associated with eight vertexes on the CMY color spaces.

The interpolation computation is carried out in accordance with the following equation.

$$K'=(1-c)\times(1-m)\times(1-y)\times Kw$$

$$+c\times(1-m)\times(1-y)\times Kc$$

$$+(1-c)\times m\times(1-y)\times Km$$

$$+(1-c)\times(1-m)\times y\times Ky$$

$$+(1-c)\times m\times y\times Kr$$

$$+c\times(1-m)\times y\times Kb$$

$$+c\times m\times(1-y)\times Kg$$

$$+c\times m\times y\times Kk$$

wherein Kw, Kc, Km, Ky, Kr, Kb, Kg, and Kk denote dot % of K-color for a printer associated with eight vertexes, respectively, and c, m and y denote CMY coordinates components in the lattice points in CMY color space, respectively.

Thus, when dot % K'i of K-color for a printer is computed in the step S109, the process goes to a step S110 in which the CMYK dot % (C', M', Y', K'), wherein the color difference ΔE is smallest, is determined in accordance with the printer profile P, in a similar fashion to that of the step S104, in a state that the computed dot % K'i of K-color is fixed.

Thus, determination of the CMYK dot % (C', M', Y', K') for a printer associated with the CMYK dot % of the lattice points existing as a lattice in the color spaces for printing makes it possible to readily create the combined profile which is high in color reproduction quality. And when the personal computer 80 shown in FIG. 1, FIG. 2 and FIG. 3 is used to perform the color conversion with such a combined profile, the proof image 61 is created sufficiently making good use of color reproduction ability of the printer 60.

According to the above explanation, as one example of the color conversion definition referred to in the present invention, there are shown the printing profile and the printer profile. Those profiles define the association between the CMYK values and the XYZ values. Any one is acceptable, as the color conversion definition referred to in the present invention, which associates so-called CMYK values with coordinates of an arbitrary color space, and it is not restricted to the above-mentioned printing profile and the like. Further, the color conversion definition referred to in the present invention is not restricted to one used in the field of printing.

According to the present embodiment, the black components are derived on eight vertexes of CMY color spaces of the cube-like configuration, and with respect to other coordinates points, the black components are determined in accordance with the interpolation. It is acceptable, however, that the first black derivation step referred to in the present invention is a step of determining black components on the representative points of n cube consisting of a combination of, for example, $$C=(a\%, b\%, \ldots, n\%)$$

$$M=(a\%, b\%, \ldots, n\%)$$

$$Y=(a\%, b\%, \ldots, n\%)$$

Further, according to the above explanation, as one example of the out of black component derivation step referred to in the present invention, there is shown a step of computing dot % K'i of K-color for a printer in accordance with the interpolation computation based on a predetermined computation expression. It is acceptable, however, that the out of black component derivation step referred to in the present invention is one in which the interpolation computation is performed in accordance with a computation expression other than the above-mentioned computation expression, or alternatively, one in which K-component is determined by a method other than the interpolation computation.

As mentioned above, according to a color conversion definition creating apparatus of the present invention, it is possible to readily create a combined color conversion definition, Which is high in color reproduction quality.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion definition creating method of creating a combined color conversion definition defining a coordinate conversion between coordinates on a first color space and coordinates on a third color space in accordance with a first color conversion definition defining a coordinate conversion between coordinates on the first color space having coordinate axes associated with four colors of cyan, magenta, yellow and black, respectively, and coordinates on a predetermined second color space, and a second color conversion definition defining a coordinate conversion between coordinates on the third color space having coordinate axes associated with four colors of cyan, magenta, yellow and black, respectively, and the coordinates on the second color space, said color conversion definition creating method comprising:

a first black component derivation step of deriving a coordinate component of the black on the third color space associated with a predetermined representative coordinate in the first color space, on the representative coordinate, in accordance with the first color conversion definition and the second color conversion definition;

a second black component derivation step of deriving a coordinate component of the black on the third color space associated with other coordinates excepting the representative coordinate in the first color space, in accordance with the coordinate component of the black on the third color space associated with the representative coordinate; and an out of black component derivation step of deriving coordinate components of cyan, magenta and yellow on the third color space, on the coordinates wherein the coordinate component of the black on the third color space is derived in said first black component derivation step and said second black component derivation step, in accordance with the coordinate component of the black derived, the first color conversion definition and the second color conversion definition.

2. A color conversion definition creating method according to claim 1, wherein said first black component derivation step comprises:

a search step of searching, under condition that the coordinate component of the black is fixed, the coordinates on the third color space wherein the second color conversion definition applies an association to coordinates close to the coordinates on the second color space wherein the first color conversion definition applies an association to the representative coordinate; and a fixed component alteration step for altering the coordinate component of the black to be fixed in said search step in accordance with a search result by said search step.

3. A color conversion definition creating method according to claim 1, wherein said representative coordinate is a coordinate of a vertex in a color space of a cube-like configuration wherein cyan, magenta and yellow are variables, in which a coordinate component of the black in the first color space is fixed.

4. A color conversion definition creating method according to claim 3, wherein said vertex comprises a point corresponding to the edge of a gamut wherein the coordinate component of the black is fixed.

5. A color conversion definition creating computer-readable program storage medium storing a color conversion definition creating program which causes a computer to operate as a color conversion definition creating apparatus, when said color conversion definition creating program is incorporated into the computer and executed, said color conversion definition creating program comprising: a first black component derivation section for deriving a coordinate component of the black on the third color space associated with a predetermined representative coordinate in the first color space, on the representative coordinate, in accordance with the first color conversion definition and the second color conversion definition; a second black component derivation section for deriving a coordinate component of the black on the third color space associated with other coordinates excepting the representative coordinate in the first color space, in accordance with the coordinate component of the black on the third color space associated with the representative coordinate; and an out of black component derivation section for deriving coordinate components of cyan, magenta and yellow on the third color space, on the coordinates wherein the coordinate component of the black on the third color space is derived in said first black component derivation section and said second black component derivation section, in accordance with the coordinate component of the black derived, the first color conversion definition and the second color conversion definition.

6. A color conversion definition creating apparatus for creating a combined color conversion definition defining a coordinate conversion between coordinates on a first color space and coordinates on a third color space in accordance with a first color conversion definition defining a coordinate conversion between coordinates on the first color space having coordinate axes associated with four colors of cyan, magenta, yellow and black, respectively, and coordinates on a predetermined second color space, and a second color conversion definition defining a coordinate conversion between coordinates on the third color space having coordinate axes associated with four colors of cyan, magenta, yellow and black, respectively, and the coordinates on the second color space, said color conversion definition creating apparatus comprising:

a first black component derivation section which derives a coordinate component of the black on the third color space associated with a predetermined representative coordinate in the first color space, on the representative coordinate, in accordance with the first color conversion definition and the second color conversion definition;

a second black component derivation section which derives a coordinate component of the black on the third color space associated with other coordinates excepting the representative coordinate in the first color space, in accordance with the coordinate component of the black on the third color space associated with the representative coordinate; and an out of black component derivation section which derives coordinate components of cyan, magenta and yellow on the third color space, on the coordinates wherein the coordinate component of the black on the third color space is derived in said first black component derivation section and said second black component derivation section, in accordance with the coordinate component of the black derived, the first color conversion definition and the second color conversion definition.

7. A color conversion definition creating apparatus according to claim 6, wherein said representative coordinate is a coordinate of a vertex in a color space of a cube-like configuration wherein cyan, magenta and yellow are variables, in which a coordinate component of the black in the first color space is fixed.

8. A color conversion definition creating apparatus according to claim 7, wherein said vertex comprises a point corresponding to the edge of a gamut wherein the coordinate component of the black is fixed.

* * * * *